US010612365B2

(12) United States Patent
Strei et al.

(10) Patent No.: US 10,612,365 B2
(45) Date of Patent: Apr. 7, 2020

(54) PRESSURE SENSOR CAPSULE

(71) Applicant: Rosemount Inc., Shakopee, MN (US)

(72) Inventors: David Matthew Strei, Waconia, MN (US); David Alexander Andrew, Wenatchee, WA (US); Nicholas John Haywood, Chanhassen, MN (US)

(73) Assignee: ROSEMOUNT INC., Shakopee, MN (US)

( * ) Notice: Subject to any disclaimer, the term of this patent is extended or adjusted under 35 U.S.C. 154(b) by 210 days.

(21) Appl. No.: 15/720,004

(22) Filed: Sep. 29, 2017

(65) Prior Publication Data

US 2019/0100991 A1  Apr. 4, 2019

(51) Int. Cl.
| | | |
|---|---|---|
| *E21B 47/06* | (2012.01) | |
| *G01L 7/02* | (2006.01) | |
| *G01L 19/06* | (2006.01) | |
| *G01L 19/00* | (2006.01) | |
| *G01L 7/06* | (2006.01) | |
| *G01L 7/08* | (2006.01) | |

(52) U.S. Cl.
CPC .............. *E21B 47/06* (2013.01); *G01L 7/061* (2013.01); *G01L 7/082* (2013.01); *G01L 19/0046* (2013.01); *G01L 19/0645* (2013.01)

(58) Field of Classification Search
None
See application file for complete search history.

(56) References Cited

U.S. PATENT DOCUMENTS

| | | | |
|---|---|---|---|
| 3,841,158 A * | 10/1974 | Hunter | ................. G01L 13/023 73/721 |
| 3,898,877 A | 8/1975 | McArthur | |
| 4,269,063 A | 5/1981 | Escaron et al. | |
| 5,337,612 A | 8/1994 | Evans | |
| 6,439,055 B1 * | 8/2002 | Maron | ..................... G01L 9/06 73/705 |
| 6,604,582 B2 | 8/2003 | Flowers | |
| 2002/0053241 A1 | 5/2002 | Morikawa et al. | |
| 2009/0288493 A1 * | 11/2009 | Larson | ................ G01L 19/0645 73/729.1 |
| 2015/0007976 A1 * | 1/2015 | Godager | ................ E21B 33/14 166/64 |

(Continued)

FOREIGN PATENT DOCUMENTS

DE    10 2011 017824    10/2012

OTHER PUBLICATIONS

Invitation to Pay Additional Fees and, Where Applicable, Protest Fees from PCT/US2018/039421, dated Sep. 13, 2018.

(Continued)

*Primary Examiner* — Jill E Culler
(74) *Attorney, Agent, or Firm* — Westman, Champlin & Koehler, P.A.

(57) ABSTRACT

A pressure sensor capsule includes a capsule body, an isolator, a pressure sensor, and a fluid fill pathway. The capsule body defines a process chamber. The isolator is supported by the capsule body and is exposed to the process chamber. The pressure sensor produces a sensor output that is indicative of a pressure within an interior chamber, which is isolated from the process chamber by the isolator. The fluid fill pathway extends from the process chamber to the interior chamber.

20 Claims, 3 Drawing Sheets

(56) References Cited

U.S. PATENT DOCUMENTS

2016/0011066 A1* 1/2016 Taverner ............... G01L 11/025
356/73.1

OTHER PUBLICATIONS

Article entitled: "Downhole Monitoring: The Story So Far", by Joseph Eck et al., 1999/2000, 14 pgs.
Article entitled: "Kuster Quantum K117 Quartz", Probe Long Beach Technical Center, 2012, 1 pg.
Notification of Transmittal of the International Search Report and the Written Opinion of the International Searching Authority from International Application No. PCT/US2018/039421, dated Dec. 12, 2018.

* cited by examiner

PRESSURE SENSOR CAPSULE

FIELD

Embodiments of the present disclosure are generally directed to pressure transmitters and, more specifically, to a pressure sensor capsule.

BACKGROUND

Drilling systems utilize pressure transmitters to measure a bottom hole pressure within a wellbore. Such pressure transmitters include a pressure sensor that is isolated from the wellbore fluids using an isolator, such as a bellows or a diaphragm. The pressure of the wellbore fluids is sensed by the pressure sensor through the isolator. The sensed pressure may be communicated to the surface through a cable.

SUMMARY

Embodiments of the present disclosure are directed to a pressure sensor capsule for use with a pressure transmitter, and a method. One embodiment of the pressure sensor capsule includes a capsule body, an isolator, a pressure sensor, and a fluid fill pathway. The capsule body defines a process chamber. The isolator is supported by the capsule body and is exposed to the process chamber. The pressure sensor produces a sensor output that is indicative of a pressure within an interior chamber, which is isolated from the process chamber by the isolator. The fluid fill pathway extends from the process chamber to the interior chamber.

In one embodiment of the method, a pressure sensor capsule is provided. The pressure sensor capsule includes a capsule body that defines a process chamber, an isolator that is supported by the capsule body and is exposed to the process chamber, a pressure sensor having a sensor output that is indicative of a pressure within an interior chamber, which is isolated from the process chamber by the isolator, and a fluid fill pathway that extends from the process chamber to the interior chamber. The interior chamber is filled with an isolation fluid through the fluid fill pathway. The fluid fill pathway is then sealed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
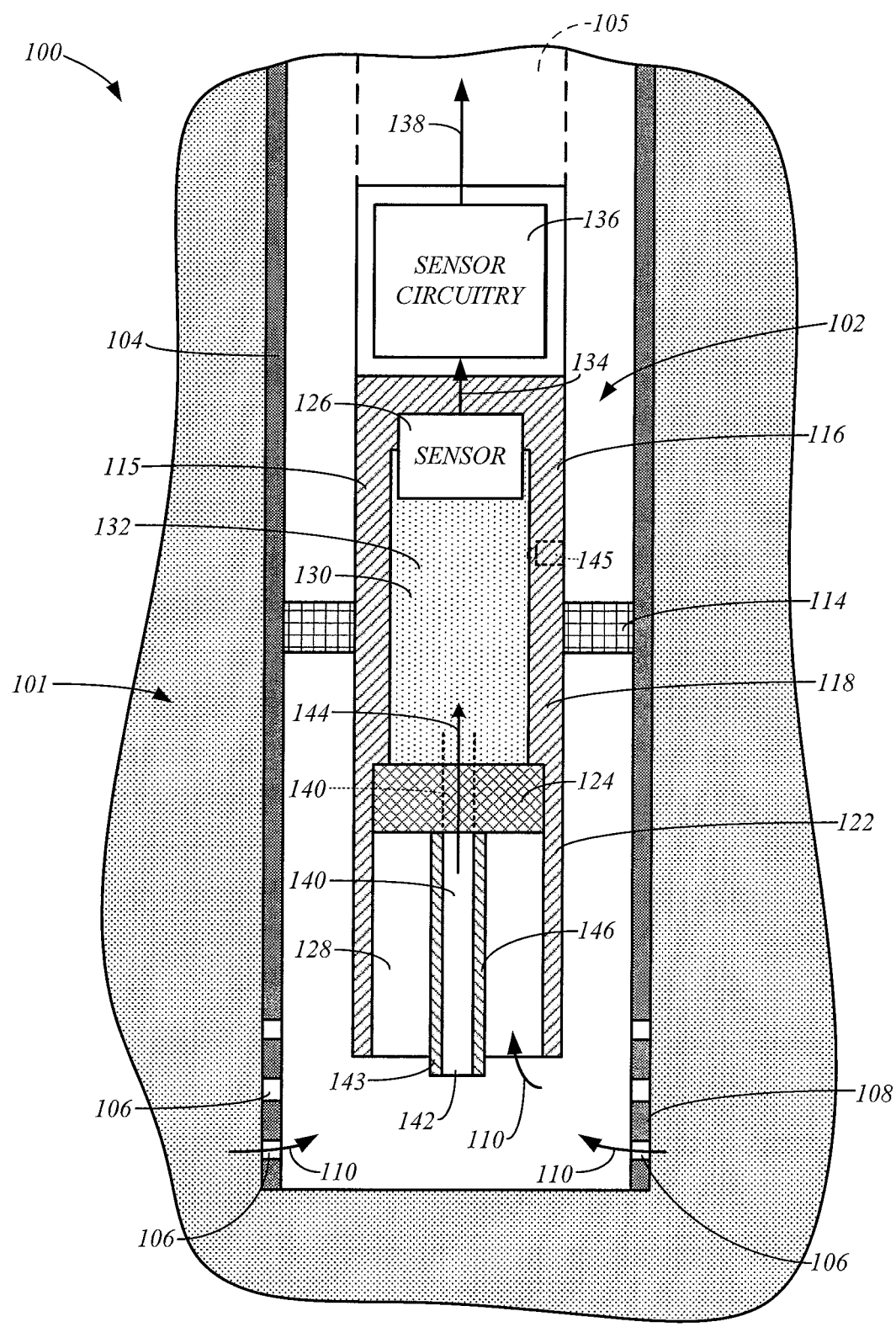
FIG. 1 is a simplified cross-sectional view of a pressure transmitter, which is formed in accordance with embodiments of the present disclosure, within an exemplary wellbore.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

FIG. 1 is a simplified cross-sectional view of a pressure transmitter 100, which is formed in accordance with embodiments of the present disclosure. In some embodiments, the pressure transmitter 100 may take the form of a downhole pressure transmitter that is configured to be positioned within a wellbore 101, as shown in FIG. 1. The transmitter 100 includes pressure sensor capsule 102 that supported within a housing 104. The housing 104 may also include a body 105 representing additional components. That capsule 102 may be attached to an adjoining component 105 through a threaded coupling, for example. The housing 104 may include openings 106 at a distal end 108 that permit entry of wellbore fluids, which are indicated by arrows 110, to expose a portion of the pressure sensor capsule 102 to wellbore fluid pressures.

In some embodiments, a seal 114 is formed between an interior body 115 and the housing 104. The body 115 may include the capsule 102 or another component (105) of the transmitter 100. The seal 114 prevents the wellbore fluids 110 from escaping to the surface. Additionally, the seal 114 divides the pressure sensor capsule 102 into an upper portion 116 that is exposed to atmospheric pressures through the tool housing 104, and a lower portion 118 that is exposed to the wellbore fluid pressure.

In some embodiments, the capsule 102 includes a capsule body 122, an isolator 124, and a pressure sensor 126. The capsule body 122, which may be a component of the body 115, defines a processor chamber 128 that is configured to be exposed to the wellbore fluids 110 when positioned in the wellbore 101, as indicated in FIG. 1.

The isolator 124 is supported by the capsule body 122 and is exposed to the process chamber 128. The isolator 124 may take the form of a bellows, a diaphragm, or other suitable isolators for use in pressure transmitters.

The pressure sensor capsule 102 includes an interior chamber 130 that may be filled with an isolation fluid 132. The interior chamber 130 and the fluid 132 are isolated from the process chamber 128 by the isolator 124. A pressure within the process chamber 128 is communicated to the isolation fluid 132 in the chamber 130 through the isolator 124.

The pressure sensor 126 produces a sensor output 134 that is indicative of a pressure within the interior chamber 130 and, therefore, the pressure within the process chamber 128. Exemplary pressure sensors 126 include a piezoresistive strain gauge, a piezoelectric sensor, or anther suitable sensor, arranged in a conventional manner to detect the pressure within the interior chamber 130.

In some embodiments, the transmitter 100 includes sensor circuitry 136 that processes the sensor output 134 from the pressure sensor 126, and communicates data 138 to the surface in a conventional manner. The processing of the sensor output 134 by the sensor circuitry 136 may include compensating the sensor output 134 based on temperature and/or other parameters, digitizing the sensor output 134, and/or other conventional sensor signal processing. The data 138 may include the pressure sensed by the sensor 126, temperature readings, and other data.

In some embodiments, the pressure sensor capsule 102 includes a fluid fill pathway 140 that is used to fill the interior chamber 130 with the isolation fluid 132. In some embodiments, the fluid fill pathway 140 extends from the process chamber 128 to the interior chamber 130, as shown in FIG. 1.

With the pressure transmitter 100 removed from the wellbore 101, the isolation fluid 132 may be driven into the interior chamber 130 through a fill port 142 at an end 143 of the fluid fill pathway 140 that is exposed to the process chamber 128, as indicated by arrow 144 in FIG. 1. The end 143 of the fluid fill pathway 140 is then sealed (not shown) to thereby seal the interior chamber 130. When the pressure transmitter 100 is positioned in the wellbore 101, end 143 is in the lower portion 118 that is exposed to the wellbore fluid pressure.

The sealing of the fluid fill pathway 140 and the interior chamber 130 requires that it be capable of maintaining the seal over a differential pressure between the isolation fluid 132 in the interior chamber 130 and the pressure of the wellbore fluids 110 within the process chamber 128. In some embodiments, the interior chamber 130 is pressurized by the isolator 124. For example, the differential pressure between the isolation fluid 132 within the chamber 130 and the wellbore fluids in the process chamber 128 may be relatively small, such as 100 psi, for example.

The above-described arrangement provides significant advantages over conventional fluid fill pathways of downhole pressure transmitters. For instance, conventional downhole pressure transmitters utilize a fluid fill pathway 145 (phantom lines) that extends from the interior chamber 130 and through the capsule body 122 to a location that is in the upper portion 116 of the body 115 and exposed to atmospheric conditions during use of the transmitter 100. Due to the low pressure of the atmospheric conditions relative to the wellbore fluid pressure at the lower portion 118 of the capsule body 122, the fluid retaining requirements of the conventional fluid fill pathway 145 must be more robust than the fluid fill pathway 140 of the capsule 102 formed in accordance with embodiments of the present disclosure. As a result, the transmitter 100 may be formed more compactly (i.e., smaller diameter) than conventional downhole pressure transmitters.

Some embodiments of the pressure sensor capsule 102 include a fill tube 146 that defines at least a portion of the fluid fill pathway 140. In some embodiments, the fill tube 146 extends into the process chamber 128. The fill tube 146 may also extend through the process chamber 128 and outside the capsule body 122, as shown in FIG. 1. This provides easy access to the fill port 142 at the end 143 of the tube 146.

The fill tube 146 may be sealed using any suitable technique. In some embodiments, the fill tube 146 is formed of metal, and the end 143 may be crimped and/or welded to seal the fill tube 146, the fluid flow pathway 140 and the interior chamber 130.

Figure 2:
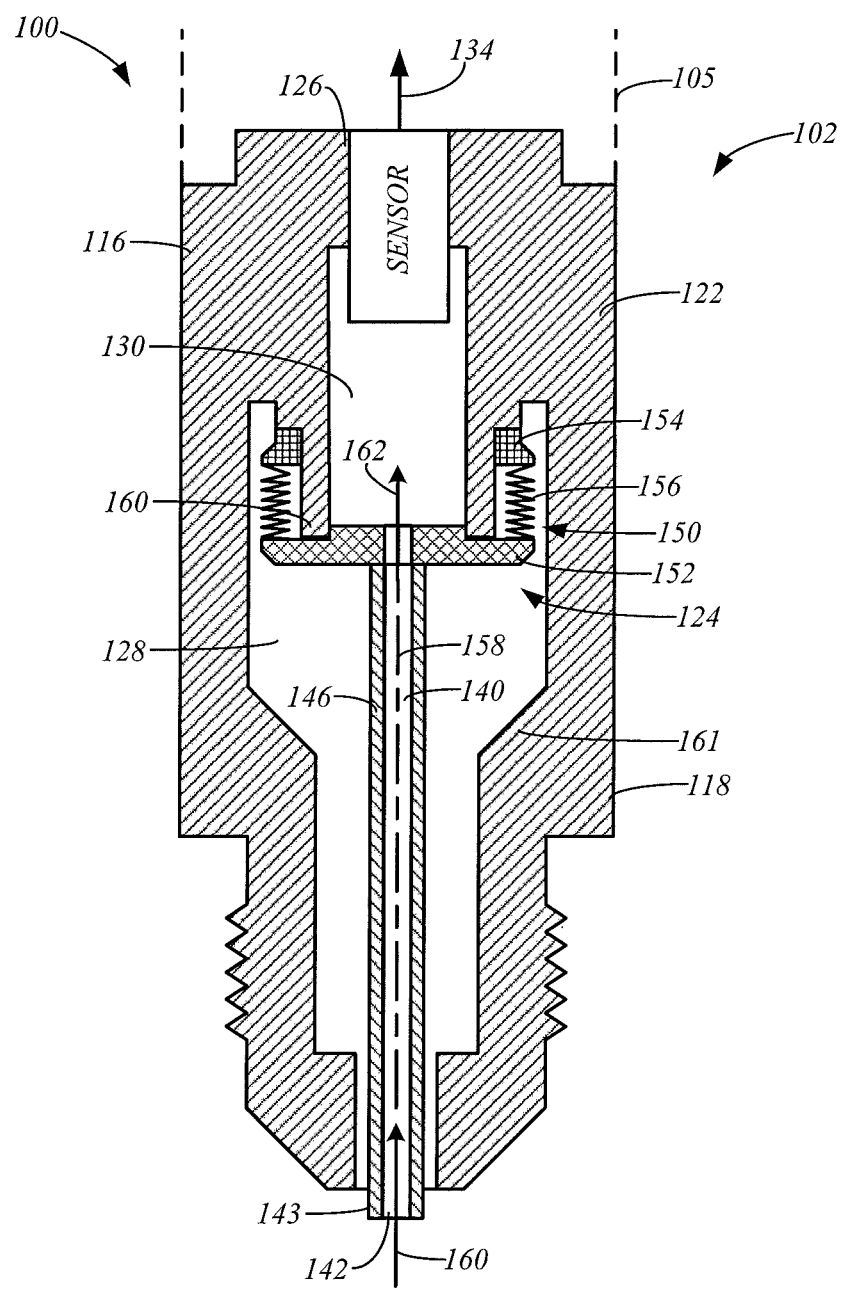
FIG. 2 is a simplified cross-sectional view of a pressure sensor capsule formed in accordance with embodiments of the present disclosure.
Figure 3:
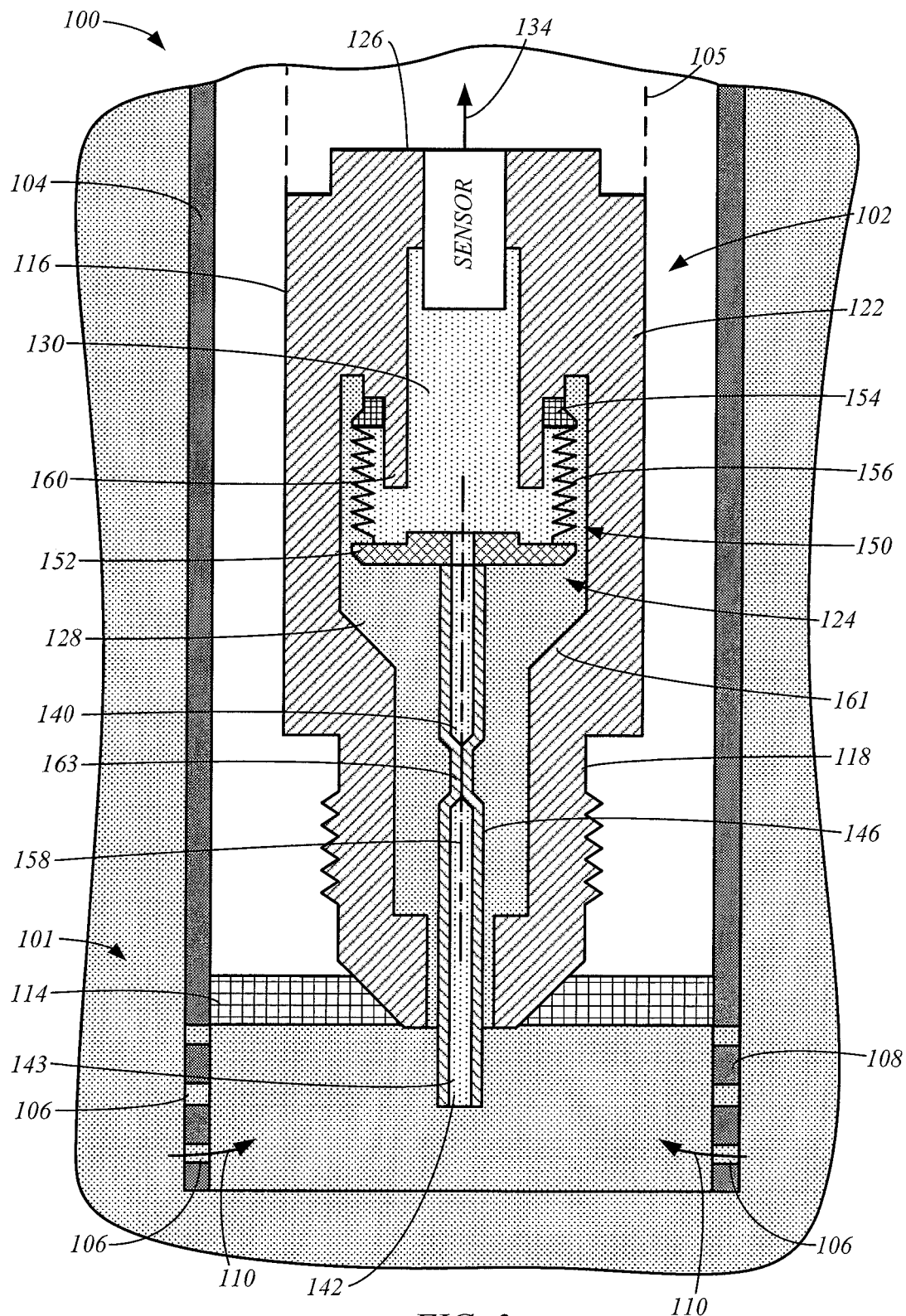
FIG. 3 is a simplified cross-sectional view of the pressure sensor capsule of FIG. 2 filled with an isolation fluid and positioned within an exemplary wellbore.

FIGS. 2 and 3 are simplified side cross-sectional views of a pressure sensor capsule 102 formed in accordance with one or more embodiments of the present disclosure. The pressure sensor capsules 102 are components of a pressure transmitter 100 and may be supported by, or formed as components of, the body 105. FIG. 3 also illustrates the pressure sensor capsule 102 being supported within a wellbore 101.

In the illustrated embodiments, the isolator 124 comprises a bellows 150 enclosing or defining at least a portion of the interior chamber 130. The bellows 150 may be formed of any suitable material, such as metal, rubber, plastic, and/or another suitable material. In some embodiments, the bellows 150 includes a distal end cap 152, a proximal end cap 154, and a flexible side wall 156.

The bellows 150 may be cylindrical and substantially coaxial to an axis 158, which may be coaxial to the sensor capsule 102 and the body 105. The end cap 152 is exposed to the process chamber 128, and is configured to move along the axis 158 in response to the expansion and contraction of the flexible side wall 156 of the bellows 150. The end cap 154 may be attached (e.g., welded) to the capsule body 122, to fix its position relative to the capsule body 122.

In some embodiments, the free or quiescent state of the bellows 150 is a compact state, in which the end cap 152 is pulled toward the end cap 154 along the axis 158 by the flexible side wall 156. This movement of the end cap 152 may be restricted, for example, by a shoulder portion 160 of the capsule body 122, as shown in FIG. 2. The inflation of the bellows 150 with the isolation fluid 132 pressurizes the interior chamber 130 and displaces the end cap 152 along the axis 158, as shown in FIG. 3. In some embodiments, the capsule body 122 includes a shoulder portion 161 that restricts movement of the end cap 152 toward the distal end of the capsule body 122 along the axis 158.

As discussed above, the fill tube 146 may extend through the process chamber and outside the capsule body 122, as shown in FIGS. 1-3. In some embodiments, the fill tube 146 is attached to the end cap 152 using any suitable technique, such as by welding the tube 146 to the end cap 152, for example. The fluid fill pathway 140 may also extend through the end cap 152, as shown in FIG. 2. The fluid fill pathway 140 may also reach the interior chamber 130 through another suitable path.

The interior cavity 130 may be filled with a desired isolation fluid 132 (FIG. 3) by injecting the isolation fluid through the fill port 142 of the exposed end 143 of the fill tube 146, as indicated by arrow 160 in FIG. 2. In some embodiments, the isolation fluid 132 travels along the fluid flow path 140 through the tube 146 and the end cap 152 and into the interior cavity 130, as indicated by arrow 162. The injection of the isolation fluid 132 into the cavity 130 through the fluid fill pathway 140 expands the bellows 150 by driving the end cap 152 along the axis 158 toward the distal end of the pressure sensor capsule 102, and pressurizes the interior cavity 130. The fluid fill pathway 140 may then be sealed, as shown in FIG. 3. For example, the end 143 of the fill tube 146 may be crimped and/or welded at 163 to seal the port 142, fluid fill pathway 140, and the interior cavity 130, as shown in FIG. 3.

For accurate pressure measurements, it is important for the isolation fluid 132 to remain in liquid form. Thus, the isolation fluid 132 should not contain any gas in solution and the fluid itself should not boil or turn partially to vapor within the interior cavity 130 when the transmitter 100 is subjected to the temperature and pressure ranges within the wellbore 101.

In some embodiments, the pressure within the interior cavity 130 is greater than ambient pressure by approximately 50 psi, approximately 100 psi, approximately 150 psi, or approximately 200 psi or more. This pressurization of the isolation fluid 132 within the chamber 130 allows the pressure sensor capsule 102 to utilize a less expensive isolation fluid than would be possible if the interior chamber 130 was not pressurized in this manner. For example, in some embodiments, the isolation fluid 132 has a vapor pressure at 200° C. and atmospheric pressure of about 1-7.0 Torr, greater than 1.0 Torr, greater than 2.0 Torr, greater than 3.0 Torr, greater than 4.0 Torr, greater than 5.0 Torr, or greater than 6.0 Torr. One suitable isolation fluid 132 is MultiTherm PG-1 mineral oil, which as a vapor pressure of 6.4 Torr at 200° C. and atmospheric pressure. This may be compared to more expensive isolation fluids, such as Krytox L-15 produced by DuPont, which has a vapor pressure of 0.1 Torr at 200° C. and atmospheric pressure, that are required for use by isolators (e.g., round foil diaphragm isolators) that apply a significantly lower pressures (e.g., 35 psi) to the isolation fluid.

Some embodiments of the present disclosure are directed to a method. In some embodiments of the method, a pressure sensor capsule 102 formed in accordance with one or more embodiments of the present disclosure is provided. Next, the interior chamber 130 is filled with an isolation fluid 132 through a fluid fill pathway 140, and the fluid fill pathway 140 is sealed, such as discussed above with reference to FIGS. 1-3.

In some embodiments, the pressure sensor capsule 102 includes a fill tube 146 that defines at least a portion of the fluid fill pathway 140 and extends through the process chamber 128. The fluid fill pathway 140 and the interior cavity 130 is sealed by sealing the fill tube 146, such as by crimping and/or welding the end 143 of the fill tube 146.

In some embodiments, an isolator 124 of the capsule 102 includes a bellows 150 that encloses and defines at least a portion of the interior cavity 130, as shown in FIGS. 2 and 3. In some embodiments, the bellows 150 includes an endcap 152 to which the fill tube 146 is attached. The end cap 152 may also include an opening defining a portion of the fluid fill pathway 140, as shown in FIGS. 2 and 3. In some embodiments of the method, the bellows applies a pressure on the isolation fluid 132 contained in the interior chamber 130 of greater that approximately 50 psi, 100 psi, 150 psi, or 200 psi, for example.

In some embodiments of the method, the sensor capsule 102 is positioned in a wellbore 101, as shown in FIGS. 1 and 3. The process chamber 128 is exposed to a pressure within the wellbore, which affects a pressure within the interior chamber 130. The pressure within the interior chamber 130 is sensed using a pressure sensor 126, which is indicative of the pressure within the wellbore. A sensor output 134 indicative of the sensed pressure is generated by the pressure sensor 126.

Although the embodiments of the present disclosure have been described with reference to preferred embodiments, workers skilled in the art will recognize that changes may be made in form and detail without departing from the spirit and scope of the present disclosure.

What is claimed is:

1. A pressure sensor capsule comprising:
a capsule body defining a process chamber;
an isolator supported by the capsule body and exposed to the process chamber and a first pressure within the process chamber;
a pressure sensor having a sensor output indicative of a second pressure within an interior chamber, which is isolated from the process chamber by the isolator, wherein the first pressure is applied to the interior chamber through the isolator to generate the second pressure such that the second pressure is related to the first pressure; and
a fluid fill pathway extending from the process chamber to the interior chamber.

2. The capsule according to claim 1, further comprising a fill tube defining at least a portion of the fluid fill pathway, wherein the fill tube extends into the process chamber.

3. The capsule according to claim 2, wherein an end of the fill tube extends through the process chamber and outside the capsule body.

4. The capsule according to claim 1, wherein the isolator comprises a bellows enclosing at least a portion of the interior chamber.

5. The capsule according to claim 4, wherein the fluid fill pathway extends into the portion of the interior chamber enclosed by the bellows.

6. The capsule according to claim 5, wherein:
a distal end of the bellows includes a first end cap that is exposed to the process chamber; and
the fluid fill pathway extends through the first end cap.

7. The capsule according to claim 6, further comprising a fill tube defining at least a portion of the fluid fill pathway, and extending into the process chamber.

8. The capsule according to claim 7, wherein a first end of the fill tube is attached to the first end cap.

9. The capsule according to claim 8, wherein the fill tube is welded to the first end cap.

10. The capsule according to claim 8, wherein a second end of the fill tube extends through the process chamber and outside the capsule body.

11. The capsule according to claim 6, wherein the isolator includes a second end cap attached to a proximal end of the bellows.

12. The capsule according to claim 11, wherein:
the interior chamber is filled with an isolation fluid; and
the fill tube is sealed.

13. The capsule according to claim 12, wherein the bellows applies a third pressure to the isolation fluid in the interior chamber that is greater than approximately 50 psi more than ambient pressure.

14. The capsule according to claim 1, further comprising transmitter electronics configured to process the sensor output.

15. A method comprising:
providing a pressure sensor capsule comprising:
a capsule body defining a process chamber;
an isolator supported by the capsule body and exposed to the process chamber and a first pressure within the process chamber;
a pressure sensor having a sensor output indicative of a second pressure within an interior chamber, which is isolated from the process chamber by the isolator, wherein the first pressure is applied to the interior chamber through the isolator to generate the second chamber such that the second pressure is related to the first pressure; and
a fluid fill pathway extending from the process chamber to the interior chamber, filling the interior chamber with an isolation fluid through the fluid fill pathway; and
sealing the fluid fill pathway.

16. The method according to claim 15, wherein:
the pressure sensor capsule includes a fill tube extending through the process chamber and defining at least a portion of the fluid fill pathway; and
sealing the fluid fill pathway comprises sealing the fill tube.

17. The method according to claim 16, wherein the isolator comprises a bellows enclosing at least a portion of the interior chamber.

18. The method according to claim 17, wherein
the fill tube is attached to an end cap of the bellows; and
the fluid pathway extends through the end cap.

19. The method according to claim 17, wherein the method includes applying a third pressure on the isolation fluid of greater than 50 psi more than ambient pressure using the bellows.

20. A method comprising:
- providing a pressure sensor capsule comprising:
  - a capsule body defining a process chamber;
  - an isolator supported by the capsule body and exposed to the process chamber;
  - a pressure sensor having a sensor output indicative of a pressure within an interior chamber, which is isolated from the process chamber by the isolator; and
  - a fluid fill pathway extending from the process chamber to the interior chamber, filling the interior chamber with an isolation fluid through the fluid fill pathway;
- sealing the fluid fill pathway;
- positioning the sensor capsule in a wellbore;
- exposing the process chamber to a pressure within the wellbore;
- sensing a pressure within the interior chamber, which is indicative of the pressure within the wellbore, using the pressure sensor; and
- generating the sensor output indicative of the sensed pressure.

* * * * *